United States Patent
Cui et al.

(10) Patent No.: US 12,461,016 B2
(45) Date of Patent: Nov. 4, 2025

(54) METHOD AND APPARATUS FOR ANALYZING LAYING STRESS ON A CABLE

(71) Applicant: DONGGUAN POWER BUREAU OF GUANGDONG POWER GRID CO., LTD., Dongguan (CN)

(72) Inventors: Jianhua Cui, Dongguan (CN); Wen He, Dongguan (CN); Zhibin Yuan, Dongguan (CN); Xun Wu, Dongguan (CN); Zhiyang Liu, Dongguan (CN); Jufen Ye, Dongguan (CN); Rui Yang, Dongguan (CN); Guanke Liu, Dongguan (CN); Ganbiao Wang, Dongguan (CN); Fan Kuang, Dongguan (CN); Huan Li, Dongguan (CN); Yunfeng Hu, Dongguan (CN); Guo Zhai, Dongguan (CN); Zhuojia Li, Dongguan (CN); Hang Du, Dongguan (CN); Runhu Lu, Dongguan (CN)

(73) Assignee: DONGGUAN POWER BUREAU OF GUANGDONG POWER GRID CO., LTD., Dongguan (CN)

( * ) Notice: Subject to any disclaimer, the term of this patent is extended or adjusted under 35 U.S.C. 154(b) by 0 days.

(21) Appl. No.: 18/850,320

(22) PCT Filed: Nov. 24, 2022

(86) PCT No.: PCT/CN2022/133927
§ 371 (c)(1),
(2) Date: Sep. 24, 2024

(87) PCT Pub. No.: WO2023/185025
PCT Pub. Date: Oct. 5, 2023

(65) Prior Publication Data
US 2025/0110039 A1 Apr. 3, 2025

(30) Foreign Application Priority Data
Apr. 1, 2022 (CN) .......................... 202210335818.3

(51) Int. Cl.
*G01N 19/00* (2006.01)

(52) U.S. Cl.
CPC .................................. *G01N 19/00* (2013.01)

(58) Field of Classification Search
CPC ..... G01B 21/00; G06F 2113/16; G06F 30/15; G06F 30/23; H01R 35/02; H02G 11/02
See application file for complete search history.

(56) References Cited

U.S. PATENT DOCUMENTS

| 5,863,010 A | * | 1/1999 | Boomgaarden | ........ | H02G 11/02 |
| | | | | | 439/15 |
| 6,411,919 B1 | * | 6/2002 | Davis | ..................... | G01B 21/00 |
| | | | | | 702/30 |

(Continued)

FOREIGN PATENT DOCUMENTS

| CN | 102393184 A | 3/2012 |
| CN | 103941290 A | 7/2014 |

(Continued)

OTHER PUBLICATIONS

Office Action issued in Chinese Application No. 20221335818.3, dated May 24, 2022.

(Continued)

Primary Examiner — Kristina M Deherrera
Assistant Examiner — Gedeon M Kidanu
(74) Attorney, Agent, or Firm — Michael Best & Friedrich LLP (57) ABSTRACT

Provided are a method and apparatus for analyzing a laying stress on a cable. The method for analyzing a laying stress on a cable includes: segmenting, according to cable grounding manners, cable laying manners and cable bending types (Continued)

that correspond to the discrete points of pipeline detection in a cable laying channel, the discrete points; and performing, according to segmentation information and measurement information of the discrete points, stress analysis calculation on minimum segments in which the discrete points are located. In the present application, stress analysis of each segment of the cable during the cable laying process is achieved in real time, providing data support for laying the cable. Workers responsible for laying the cable can adopt corresponding protective measures during the laying process according to a stress analysis result so that the cable can be really protected, improving the safety of the cable during the cable laying process.

7 Claims, 6 Drawing Sheets

(56) References Cited

U.S. PATENT DOCUMENTS

| | | | |
|---|---|---|---|
| 7,386,428 B1 | 6/2008 | Hallquist et al. | |
| 2004/0059448 A1* | 3/2004 | Nono | G06F 30/15 700/97 |

FOREIGN PATENT DOCUMENTS

| | | | | | |
|---|---|---|---|---|---|
| CN | 104462837 | A | | 3/2015 | |
| CN | 105160098 | A | | 12/2015 | |
| CN | 106980708 | A | | 7/2017 | |
| CN | 107657093 | A | * | 2/2018 | ............ G06F 30/20 |
| CN | 109165412 | A | | 1/2019 | |
| CN | 109918815 | A | | 6/2019 | |
| CN | 209562117 | A | | 10/2019 | |
| CN | 111310401 | A | | 6/2020 | |
| CN | 111506864 | A | | 8/2020 | |
| CN | 111622807 | A | | 9/2020 | |
| CN | 112448322 | A | | 3/2021 | |
| CN | 113104657 | A | | 7/2021 | |
| CN | 113410799 | A | * | 9/2021 | ............ H02G 1/04 |
| CN | 114112157 | A | | 3/2022 | |
| CN | 114491895 | A | | 5/2022 | |

OTHER PUBLICATIONS

International Search Report issued in International Application No. PCT/CN2022/133927, dated Feb. 7, 2023.
Wu et al., "Simulation Analysis of Contact Pressure Between Overhead Ground Wire and Preformed Armor Rod Port," Dongguan Power Supply Bureau of Guangdong Power Grid Co., Ltd., China Academic Journal Electronic Publishing House, DOI 10.3969, ISSN 1007-290X, Nov. 2019, TM751.

* cited by examiner

FIG. 7

METHOD AND APPARATUS FOR ANALYZING LAYING STRESS ON A CABLE

CROSS-REFERENCES TO RELATED APPLICATIONS

This application is a national stage application filed under 35 U.S.C. 371 based on International Patent Application No. PCT/CN2022/133927, filed on Nov. 24, 2022, which claims priority to claims priority to Chinese Patent Application No. 202210335818.3 filed with the China National Intellectual Property Administration (CNIPA) on Apr. 1, 2022, the disclosure of which are incorporated herein by references in their entireties.

TECHNICAL FIELD

Embodiments of the present application relate to power system technologies and, in particular, a method and apparatus for analyzing a laying stress on a cable.

BACKGROUND

Cables have become an important part of electric transmission and distribution lines. Compared with an overhead line, the cables have been widely applied in an urban power grid because of the advantages of a large available underground space, less susceptibility to environmental impact and high reliability.

To standardize infrastructure and relocation projects and improve the management efficiency of the full lifecycle of power grid assets, it is essential to control the cable laying quality strictly. However, during the construction process of traditional cable laying, due to the limited amount of project funds and the limited construction management level of the construction personnel, for the cable laying, the stress on a cable is reduced only through manners such as mounting a tension meter and adding a pulley based on experience. Due to lack of the scientific guidance of data support, the adopted manners cannot really protect the cable, and thus the cable is vulnerable to damage and has low security.

SUMMARY

The present application provides a method and apparatus for analyzing a laying stress on a cable to protect the cable and improve the safety of the cable during the cable laying process.

In a first aspect, an embodiment of the present application provides a method for analyzing a laying stress on a cable. The method for analyzing a laying stress on a cable includes the steps as follows. The discrete points of pipeline detection in a cabling channel are segmented according to cable grounding manners, cabling manners and cable bending types that correspond to the discrete points. Stress analysis calculation is performed on minimum segments in which the discrete points are located according to segmentation information and measurement information of the discrete points.

In a second aspect, an embodiment of the present application further provides an apparatus for analyzing a laying stress on a cable. The apparatus for analyzing a laying stress on a cable includes a first layer data processing module, a second layer data processing module, a third layer data processing module, a stress analysis calculation module and a sorting module. The first layer data processing module is configured to perform first level segmentation on discrete points according to cable grounding manners corresponding to the discrete points. The second layer data processing module is configured to perform second level segmentation on discrete points in each segment after previous segmentation according to cabling manners corresponding to the discrete points. The third layer data processing module is configured to perform third level segmentation on each minimum segment in which discrete points are located after previous segmentation according to cabling bending types to which the discrete points belong. The stress analysis calculation module is configured to perform stress analysis calculation on the discrete points according to segmentation information and measurement information of the discrete points. The sorting module is configured to initially sort and number the discrete points according to a pipeline detection direction and a cable line direction and re-sort and number discrete points in each segment after each of the first level segmentation, the second level segmentation and the third level segmentation.

In the method and apparatus for analyzing a laying stress on a cable provided in this embodiment, discrete points are segmented according to the cable grounding manners, the cabling manners and the cable bending types that correspond to the discrete points of the pipeline detection in the cabling channel, successive discrete points belonging to the same cable grounding manner, the same cabling manner, and the same cable bending type are classified into the same segment, and further, according to the segmentation information and the measurement information of the discrete points, the stress analysis calculation is performed on the discrete points so that at least one of a traction force or a side pressure that is applied to each segment of the cable in real time during the laying process can be obtained. In this manner, stress analysis of the each segment of the cable during the cable laying process can be achieved in real time, providing data support for laying the cable. Workers responsible for laying the cable can adopt corresponding protective measures during the laying process according to a stress analysis result so that the cable can be really protected, improving the safety of the cable during the cable laying process.

DETAILED DESCRIPTION

The present application is further described in detail hereinafter in conjunction with the drawings and embodiments. It is to be understood that the embodiments described herein are intended to explain the present application and not to limit the present application. Additionally, it is also to be noted that for ease of description, only part, not all, of structures related to the present application are illustrated in the drawings.

As described in the background, during the construction process of traditional cable laying, during the cable laying process, the workers reduce the stress on the cable only through manners such as mounting a tension meter and adding a pulley based on experience. It has been found through research that these manners for reducing the stress on the cable lack the scientific guidance of data support, due to the lack of an accurate stress analysis, the cable is often dragged during the laying process, resulting in an excessive local stress on the cable due to various reasons such as turning or inclining and as a result, an outer sheath of the cable is deformed and damaged. The cable damaged in this manner poses a huge safety hidden danger in the power grid. During the later operation process, the power grid is very likely to undergo a power equipment failure caused by breakdown of the main insulation of the cable due to discharging and ablation, or even a serious accident such as a large-scale and large-area power outage or casualties. The cable being laid underground may increase the difficulty of repairing a cable line to restore power supply. Therefore, manners such as mounting the tension meter and adding the pulley based on experience are not effective and pose relatively great risks.

Figure 1:
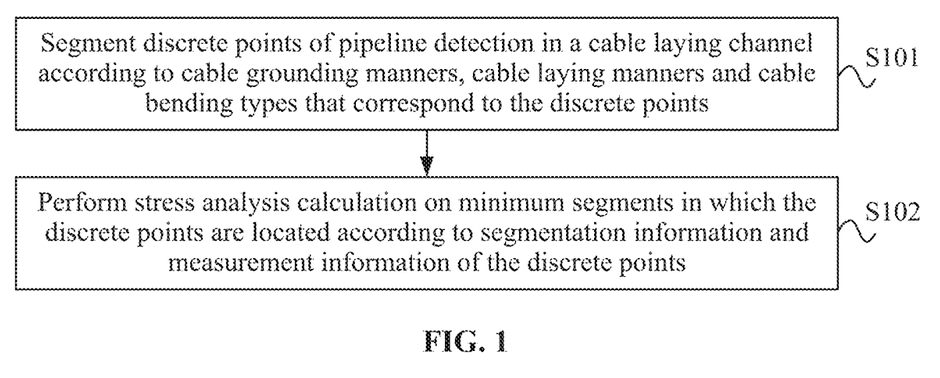
FIG. 1 is a flowchart of a method for analyzing a laying stress on a cable according to an embodiment of the present application.

Based on the preceding problems, an embodiment of the present application provides a method for analyzing a laying stress on a cable. FIG. 1 is a flowchart of a method for analyzing a laying stress on a cable according to an embodiment of the present application. Referring to FIG. 1, the method for analyzing a laying stress on a cable includes the steps below.

In S101, discrete points of pipeline detection in a cabling channel are segmented according to cable grounding manners, cabling manners and cable bending types that correspond to the discrete points.

Specifically, the cabling channel is an underground channel excavated according to a planned direction, a planned length and a planned size before the cable laying. The cable may be laid within the cabling channel as planned. The pipeline detection refers to the detection of the cabling channel before the cable laying and is carried out by a qualified pipeline measurement unit commissioned by a construction entity when the cabling channel is formed in a civil engineering special project of a cable part of a power transmission and transformation project. A result of the pipeline detection may be embodied in the form of coordinates of the discrete points. A coordinate system adopted for the discrete points is generally consistent with a coordinate system used in urban planning and construction. Exemplarily, a coordinate system and a vertical datum that are adopted in the re-measurement of a cabling channel pipeline in a newly built power transmission and transformation project in Dongguan are the Pearl District coordinate system and the National Vertical Datum of 1985 respectively. In the pipeline detection, horizontal positions and heights of the discrete points are generally determined using a verified total station and measured using a polar coordinate method and a trigonometric leveling method respectively. Data of the pipeline detection of the cabling channel may include coordinates of several successive discrete points. In the method for analyzing a laying stress on a cable, segmentation data processing may be performed first, that is, the several successive discrete points are segmented according to a segmentation information attribute included in each discrete point so that several successive data segments can be formed, where the segmentation information attribute includes a cable grounding manner, a cabling manner and a cable bending type. The cable grounding manners include direct grounding at one end+protective grounding at the other end, protective grounding at two ends+direct grounding at the middle point and cross-interconnection grounding, where a grounding well of each non-end point may be used as a segmentation point, and two sides of the segmentation point belong to different segments respectively. The cabling manners include cable nonbuilding structure laying, calandria laying and dragging pipe laying. A conversion point of two cabling manners may be used as a segmentation point, and two sides of the segmentation point belong to different segments respectively. The cable bending types include horizontal traction, inclined straight traction and vertical traction. A conversion point of each cable bending type may also be used as a segmentation point, and two sides of the segmentation point belong to different segments respectively. The discrete points are segmented according to the cable grounding manners, the cabling manners and the cable bending types that correspond to the discrete points, and successive discrete points belonging to the same cable grounding manner, the same cabling manner and the same cable bending type are classified into the same segment.

In S102, stress analysis calculation is performed on minimum segments in which the discrete points are located according to segmentation information and measurement information of the discrete points.

Specifically, the segmentation information may include the cable grounding manners, the cabling manners and the cable bending types that correspond to segments in which the discrete points are located. The measurement information is measurement data obtained in the pipeline detection process and may include the coordinates of the discrete points, a friction coefficient for laying the cable and the weight of the cable per unit length. The stress analysis calculation of the minimum segments in which the discrete points are located includes at least one of the calculation of a traction force or the calculation of a side pressure and may be calculated according to the segmentation information of the discrete points and the measurement information of the discrete points. The discrete points in different segments have different segmentation information, so traction forces of the different segments are different, side pressures of the different segments are also different, and these may be obtained based on specific calculation.

In the method for analyzing a laying stress on a cable provided in this embodiment, the discrete points of the pipeline detection in the cabling channel are segmented according to the cable grounding manners, the cabling manners and the cable bending types that correspond to the discrete points, successive discrete points belonging to the same cable grounding manner, the same cabling manner, and the same cable bending type are classified into the same segment, and further, the stress analysis calculation is performed on the discrete points according to the segmentation information and the measurement information of the discrete points so that at least one of a traction force or a side pressure that is applied to each segment of the cable in real time during the laying process can be obtained. In this manner, stress analysis of the each segment of the cable during the cable laying process can be achieved in real time, providing data support for laying the cable. Workers responsible for laying the cable can adopt corresponding protective measures during the laying process according to a stress analysis result so that the cable can be really protected, improving the safety of the cable during the cable laying process.

Figure 2:
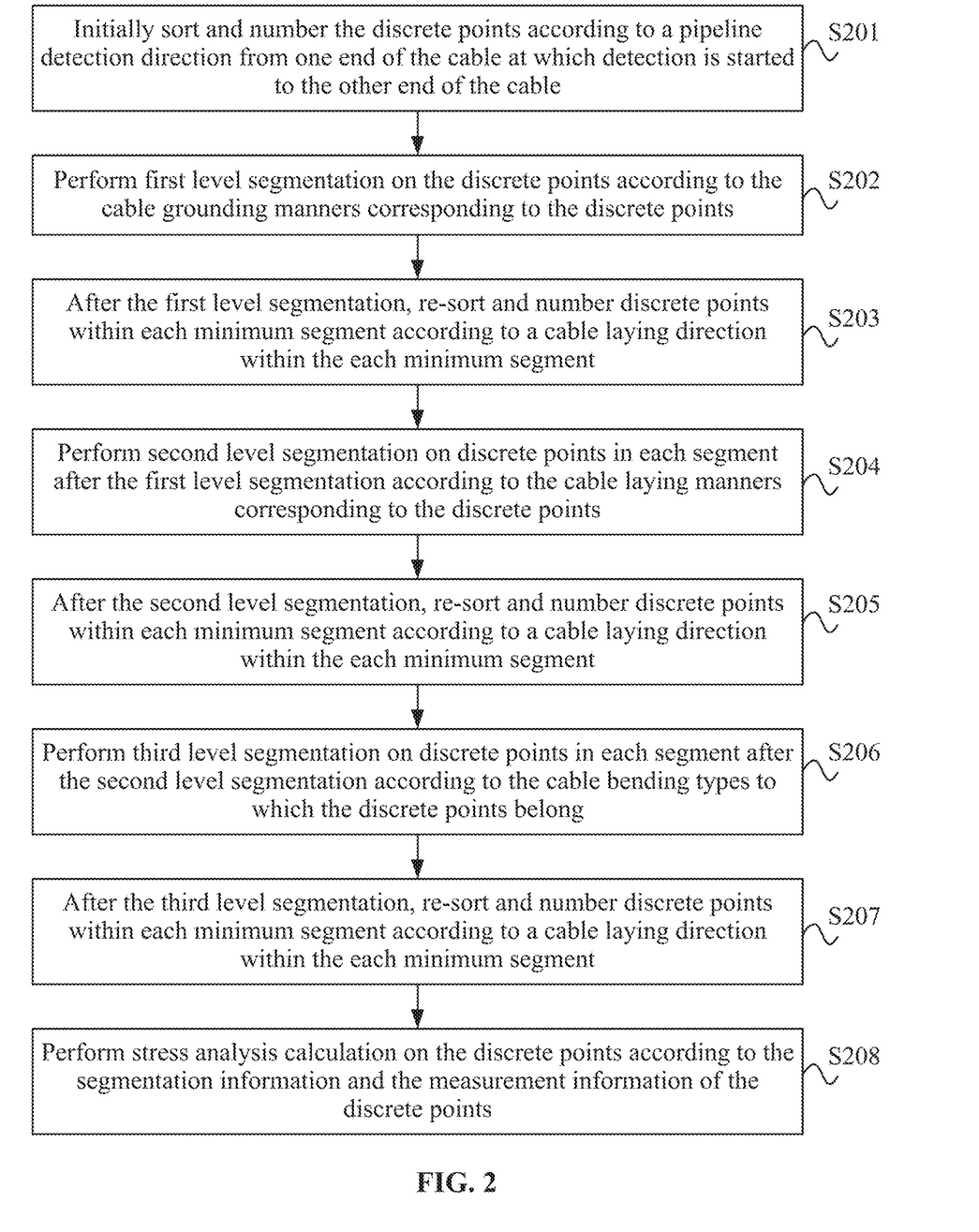
FIG. 2 is another flowchart of a method for analyzing a laying stress on a cable according to an embodiment of the present application.

FIG. 2 is another flowchart of a method for analyzing a laying stress on a cable according to an embodiment of the present application. Referring to FIG. 2, the method for analyzing a laying stress on a cable includes the steps below.

In S201, the discrete points are initially sorted and numbered according to a pipeline detection direction from one end of the cable at which detection is started to the other end of the cable.

Specifically, the pipeline detection direction of the cabling channel may be consistent with a cable line orientation. Since the discrete points are measured one by one in the detection process, the detection direction may also be used as an initial sorting direction of the discrete points. The pipeline detection direction refers to a forward direction of the pipeline detection before the cable laying, it is stipulated that the pipeline detection is carried out according to the cable line orientation, and the cable line orientation is a direction of lines in ascending order in the cable, for example, the direction from No. 1 to No. 2 in the cable or the direction from No. 1 well to No. 2 well in the cable. Before the laying stress on the cable is analyzed, the discrete points are first sorted successively according to the pipeline detection direction from the end of the cable at which the detection is started to the other end of the cable. Exemplarily, data obtained by the pipeline detection in the laying channel includes 1500 successive discrete points in total. Starting from a first discrete point at one end of the starting point of the pipeline detection direction of the cable, the 1500 discrete points are sorted successively from the number 1 to an endpoint in a cable laying direction according to the sequence of positive integers and are numbered as GD1, GD2, GD3, GD4, GD5, GD6, GD7, GD8, . . . , GD1499 and GD1500. GD1500 is the endpoint in the pipeline detection direction of the cable.

In S202, first level segmentation is performed on the discrete points according to the cable grounding manners corresponding to the discrete points.

Specifically, the cable grounding manners include the direct grounding at one end+protective grounding at the other end, the protective grounding at two ends+direct grounding at the middle point and the cross-interconnection grounding. When the line of the cable is not long, the cable generally uses the direct grounding at one end of the line+protective grounding at the other end of the line. The first level segmentation of the line of the cable includes one segment. The segmentation information of all the discrete points about the first level segmentation may be recorded as No. 1 of the line of the cable to No. 2 of the line of the cable, that is, all the discrete points are located between No. 1 endpoint of the line of the cable and No. 2 endpoint of the line of the cable. When the line of the cable is slightly longer, the grounding mode of the direct grounding at one end+ protective grounding at the other end cannot meet requirements, and the line of the cable cannot be divided into three segments to form the cross-interconnection grounding, the cable may use the protective grounding at two ends of the line+direct grounding at the middle point of the line. The first level segmentation of the line of the cable includes two segments. The segmentation information of the discrete points about the first level segmentation may be recorded as No. 1 of the line of the cable to No. 1 well of the line of the cable or No. 1 well of the line of the cable to No. 2 of the line of the cable. If the segmentation information of the discrete points about the first level segmentation is No. 1 of the line of the cable to No. 1 well of the line of the cable, this indicates that these discrete points are located between No. 1 endpoint of the line of the cable and No. 1 joint well of the line of the cable. If the segmentation information of the discrete points about the first level segmentation is No. 1 well of the line of the cable to No. 2 of the line of the cable, this indicates that these discrete points are located between No. 1 joint well of the line of the cable and No. 2 endpoint of the line of the cable. When the line of the cable is relatively long, the grounding mode of the protective grounding at the two ends of the line+direct grounding at the middle point of the line cannot meet requirements, a metal sheath of the cable and insulation shield of the cable are generally evenly segmented into three segments or multiples of three segments by using insulation joints, and the cross-interconnection grounding is used. The line of the cable may be divided into multiple segments. The segmentation information of the discrete points about the first level segmentation may be recorded as No. 1 of the line of the cable to No. 1 well of the line of the cable, No. 1 well of the line of the cable to No. 2 well of the line of the cable and No. 2 well of the line of the cable to No. 3 well of the line of the cable. The segmentation information of the discrete points about the first level segmentation may be recorded in this manner according to the number of segments, the meaning of the segmentation information is the same as that of the segmentation information of the protective grounding at the two ends of the line+direct grounding at the middle point of the line.

Exemplarily, if the first level segmentation of the line of a certain cable is No. 1 of the line of the cable to No. 1 well of the line of the cable, No. 1 well of the line of the cable to No. 2 well of the line of the cable and No. 2 well of the line of the cable to No. 2 of the line of the cable (that is, three segments), and the direction of pipeline re-detection in the cabling channel is consistent with the cable line orientation, a result of the pipeline detection in the laying channel includes 1500 successive discrete points in total, and starting from the number 1, according to the sequence of positive integers, the 1500 discrete points are successively sorted as GD1, GD2, GD3, GD4, GD5, GD6, GD7, GD8, . . . , GD1499 and GD1500. When GD400 and GD1100 are discrete points at intermediate locations of No. 1 well of the line of the cable and No. 2 well of the line of the cable respectively, GD1 to GD400 may be classified into a segment from No. 1 of the line of the cable to No. 1 well of the line of the cable, GD401 to GD1100 may be classified into a segment from No. 1 well of the line of the cable to No. 2 well of the line of the cable, and GD1101 to GD1500 may be classified into a segment from No. 2 well of the line of the cable to No. 2 of the line of the cable. The segment from No. 1 of the line of the cable to No. 1 well of the line of the cable (which may be further defined as a first level segment 1), the segment from No. 1 well of the line of the cable to No. 2 well of the line of the cable (which may be further defined as a first level segment 2) and the segment from No. 2 well of the line of the cable to No. 2 of the line of the cable (which may be further defined as a first level segment 3) are three formed successive first level segments. Moreover, in the segment from No. 1 of the line of the cable to No. 1 well of the line of the cable, the first discrete point is GD1, and the last discrete point is GD400; in the segment from No. 1 well of the line of the cable to No. 2 well of the line of the cable, the first discrete point is GD401, and the last discrete point is GD1100; and in the segment from No. 2 well of the line of the cable to No. 2 of the line of the cable, the first discrete point is GD1101, and the last discrete point is GD1500. In particular, as stipulated, if the cable laying direction is consistent with the pipeline detection direction of the cable, the cable is laid forward; and if the cable laying direction and the direction of the pipeline re-detection in the cabling channel are not consistent with the cable line orientation, the cable is laid backward. Therefore, when the cable is laid backward, using the segment from No. 1 of the line of the cable to No. 1 well of the line of the cable as an example, and when the cable laying direction is from No. 1 well of the line of the cable to No. 1 of the line of the cable, that is, the backward direction, in the segment from No. 1 of the line of the cable to No. 1 well of the line of the cable, the first discrete point becomes GD400, and the last discrete point becomes GD1.

In S203, after the first level segmentation, discrete points within each minimum segment are re-sorted and numbered according to a cable laying direction within the each minimum segment.

Specifically, to facilitate the subsequent stress calculation, the discrete points included in each of several formed successive segments are also required to be successively re-sorted according to the sequence of positive integers starting from the number 1 after the first level segmentation. Along the cable laying direction, the discrete points are successively sorted and re-numbered starting from one end of the each of the several formed successive segments to the other end of the each of the several formed successive segments, where minimum segments are minimum segments obtained after the previous segmentation.

When the discrete points within the each of the several formed successive segments after the first level segmentation are sorted, whether the cable laying direction within the each of the several formed successive segments is consistent with the pipeline detection direction in the cabling channel is first determined. When the cable laying direction is consistent with the pipeline detection direction, based on the ascending order of the original numbering, the discrete points included in the each of the several formed successive segments after the first level segmentation are successively re-sorted and numbered according to the sequence of positive integers starting from the number 1. When the cable laying direction is not consistent with the pipeline detection direction, the discrete points included in the each of the several formed successive segments after the first level segmentation are successively re-sorted and numbered not only based on descending order of the original numbering but also according to the sequence of positive integers starting from the number 1.

Exemplarily, if the cable laying direction is consistent with the pipeline detection direction in the segment from No. 1 of the line of the cable to No. 1 well of the line of the cable and the segment from No. 2 well of the line of the cable to No. 2 of the line of the cable, but the cable laying direction is not consistent with the pipeline detection direction in the segment from No. 1 well of the line of the cable to No. 2 well of the line of the cable, discrete points included in the segment from No. 1 of the line of the cable to No. 1 well of the line of the cable and discrete points included in the segment from No. 2 well of the line of the cable to No. 2 of the line of the cable are successively re-sorted according to the sequence of positive integers starting from the number 1 separately, and the result is that the discrete points in the segment from No. 1 of the line of the cable to No. 1 well of the line of the cable are sorted as AGD1 (GD1 in the initial sorting), AGD2 (GD2 in the initial sorting), . . . , AGD399 (GD399 in the initial sorting) and AGD400 (GD400 in the initial sorting) and that the discrete points in the segment from No. 2 well of the line of the cable to No. 2 of the line of the cable are sorted as CGD1 (GD1101 in the initial sorting), CGD2 (GD1102 in the initial sorting), . . . , CGD399 (GD1499 in the initial sorting) and CGD400 (GD1500 in the initial sorting); and discrete points included in the segment from No. 1 well of the line of the cable to No. 2 well of the line of the cable are successively re-sorted according to the sequence of positive integers starting from the number 1, and the re-sorted discrete points are numbered in a reverse order, so the result is BGD1 (GD1100 in the initial sorting), BGD2 (GD1099 in the initial sorting), . . . , BGD699 (GD402 in the initial sorting) and BGD700 (GD401 in the initial sorting). It is to be noted that re-sorting after each segmentation may also be performed without determining the relationship between the cable laying direction and the pipeline detection direction, and discrete points within each segment are successively sorted and re-numbered directly according to the cable laying direction within the each segment. Letters before a serial number may denote information of a segment in which a discrete point is located after each segmentation. For example, B in BGD699 denotes that the discrete point is located in a second minimum segment after the first level segmentation.

In S204, second level segmentation is performed on discrete points in each segment after the first level segmentation according to the cabling manners corresponding to the discrete points.

Specifically, the cabling manners include the cable non-building structure laying, the calandria laying and the dragging pipe laying. Engineers may set different laying manners for various locations of cables according to factors such as engineering conditions of the cable laying, environmental characteristics of the cable laying, types of the cables and the number of cables. In the each segment after the operation of the first level segmentation, when the laying manner corresponding to multiple successive discrete points is the cable nonbuilding structure laying, the segmentation information of these discrete points about the second level segmentation may be recorded as the cable nonbuilding structure laying. In the each segment after the operation of the first level segmentation, when the laying manner corresponding to multiple successive discrete points is the calandria laying, the segmentation information of these discrete points about the second level segmentation may be recorded as the calandria laying; and when the laying manner corresponding to multiple successive discrete points is the dragging pipe laying, the segmentation information of these discrete points about the second level segmentation may be recorded as the dragging pipe laying. Subsequently, according to the segmentation information of the discrete points about the second level segmentation, the second level segmentation processing is performed on the discrete points in the each segment after the operation of the first level segmentation, that is, several successive discrete points are segmented according to a laying manner information attribute included in each discrete point so that the each segment after the first level segmentation can be divided into several successive smaller segments. Discrete points in each minimum segment after the second level segmentation are successive and laid in the same manner, and discrete points in two adjacent minimum segments (except for turning points in the two adjacent minimum segments) are laid in different manners.

Exemplarily, using the segment from No. 1 well of the line of the cable to No. 2 well of the line of the cable (the first segment 2) formed after the first level segmentation as an example, the discrete points included in the segment are successively BGD1 (GD1100 in the initial sorting), BGD2 (GD1099 in the initial sorting), . . . , BGD699 (GD402 in the initial sorting) and BGD700 (GD401 in the initial sorting). When BGD100 (GD1001 in the initial sorting), BGD150 (GD951 in the initial sorting), BGD200 (GD901 in the initial sorting) and BGD500 (GD601 in the initial sorting) correspond to a critical point at which the cable nonbuilding structure laying is transitioned to the calandria laying, a critical point at which the calandria laying is transitioned to the cable nonbuilding structure laying, a critical point at which the cable nonbuilding structure laying is transitioned to the dragging pipe laying and a critical point at which the dragging pipe laying is transitioned to the cable nonbuilding structure laying respectively, BGD1 to BGD100 may be classified into a segment for the cable nonbuilding structure laying, BGD100 to BGD150 may be classified into a segment for the calandria laying, BGD150 to BGD200 may be classified into a segment for the cable nonbuilding structure laying, BGD200 to BGD500 may be classified into a segment for the dragging pipe laying, and BGD500 to BGD700 may be classified into a segment for the cable nonbuilding structure laying, so BGD1 to BGD100 may be defined as a second level segment 1, BGD100 to BGD150 may be defined as a second level segment 2, BGD150 to BGD200 may be defined as a second level segment 3, BGD200 to BGD500 may be defined as a second level segment 4, and BGD500 to BGD700 may be defined as a second level segment 5. The second level segment 1 to the second level segment 5 are five successive smaller segments formed by the first level segment 2 in the operation of the second level segmentation. It is to be noted that BGD100, BGD150, BGD200 and BGD500 are repeated in two segments (the previous and current segments).

In S205, after the second level segmentation, discrete points within each minimum segment are re-sorted and numbered according to a cable laying direction within the each minimum segment.

Specifically, to facilitate the subsequent stress calculation, the discrete points included in each of several formed successive segments are also required to be successively re-sorted according to the sequence of positive integers starting from the number 1 after the second level segmentation. Along the cable laying direction, the discrete points are successively sorted and re-numbered starting from one end of the each of the several formed successive segments to the other end of the each of the several formed successive segments, where the minimum segments are minimum segments obtained after the previous segmentation. In this case, this sorting may be directly performed according to the sequence of the successive discrete points within the each minimum segment without determining the relationship between the cable laying direction and the pipeline detection direction in the cabling channel, and the discrete points are re-sorted and numbered starting from 1.

Exemplarily, using a segment from BGD200 to BGD500 among the minimum segments obtained after the second level segmentation as an example, discrete points included in the segment from BGD200 to BGD500 are successively re-sorted according to the sequence of positive integers starting from the number 1, and the result is DBGD1 (GD901 in the initial sorting and BGD200 in the second sorting), DBGD2 (GD900 in the initial sorting and BGD201 in the second sorting), . . . , DBGD300 (GD602 in the initial sorting and BGD499 in the second sorting) and DBGD301 (GD601 in the initial sorting and BGD500 in the second sorting). Letters before serial numbers may denote information of a segment in which a discrete point is located after the operation of each segmentation. For example, in DBGD301, B denotes that the discrete point is located in the second minimum segment after the first level segmentation, the first D denotes that the discrete point is located in a fourth minimum segment after the second level segmentation, and the term "fourth" herein refers to the fourth segment among all minimum segments in the previous segmentation.

In S206, third level segmentation is performed on discrete points in each segment after the second level segmentation according to the cable bending types to which the discrete points belong.

Specifically, the third level segmentation is performed on several successive minimum segments formed after the operation of the second level segmentation, that is, the successive discrete points within each minimum segment are segmented according to the cable bending types to which the discrete points belong so that multiple successive smaller segments can be formed. The object of this step is to re-segment the several successive minimum segments formed after the second level segmentation by solving the spatial locations of the discrete points and according to target characteristics of the spatial locations obtained by the solution until the formed successive minimum segments can match the minimum cable bending types (which are also called cable laying bending types) given in Appendix A of the Technical code for the design of urban power cables (DL/T 5221-2016) respectively. Discrete points in each minimum segment after the third level segmentation are successive and belong to the same minimum cable bending type, and discrete points in two adjacent minimum segments belong to different minimum cable bending types.

In S207, after the third level segmentation, discrete points within each minimum segment are re-sorted and numbered according to a cable laying direction within the each minimum segment.

Specifically, to facilitate the subsequent stress calculation, the discrete points included in each of several successive minimum segments formed after the operation of the third level segmentation are also required to be successively re-sorted according to the sequence of positive integers starting from the number 1. Without determining the relationship between the cable laying direction and the pipeline detection direction in the cabling channel, this sorting may be directly performed according to the sequence of the successive discrete points within the each minimum segment in this case, and the discrete points are re-sorted and numbered starting from 1.

Exemplarily, using a segment from DBGD20 to DBGD70 among the minimum segments after the third level segmentation as an example, discrete points included in the segment from DBGD20 to DBGD70 are successively re-sorted according to the sequence of positive integers starting from the number 1, and the result is BDBGD1 (GD882 in the initial sorting, BGD219 in the second sorting and DBGD20 in the third sorting), BDBGD2 (GD881 in the initial sorting, BGD220 in the second sorting and DBGD21 in the third sorting), . . . , BDBGD50 (GD833 in the initial sorting, BGD268 in the second sorting and DBGD69 in the third sorting) and BDBGD51 (GD832 in the initial sorting, BGD269 in the second sorting and DBGD70 in the third sorting). Letters before serial numbers may denote information of a segment in which a discrete point is located after the operation of each segmentation.

In S208, according to the segmentation information and the measurement information of the discrete points, stress analysis calculation is performed on the discrete points.

S208 has the same content as S102. Details are not repeated herein.

In the method for analyzing a laying stress on a cable provided in this embodiment, the discrete points are first sorted and numbered initially according to the cable detection sequence, all the successive discrete points are then segmented three times successively according to the cable grounding manners, the cabling manners and the cable bending types, and discrete points within each segment after each segmentation are re-sorted according to the cable laying direction so that scientific segmentation for analyzing a laying stress on a cable can be achieved. Among the three times of segmentation, the discrete points can be preliminarily classified and segmented according to the characteristics in the previous two times of segmentations, reducing the difficulty of the third level segmentation and improving the effect for analyzing the stress.

Figure 3:
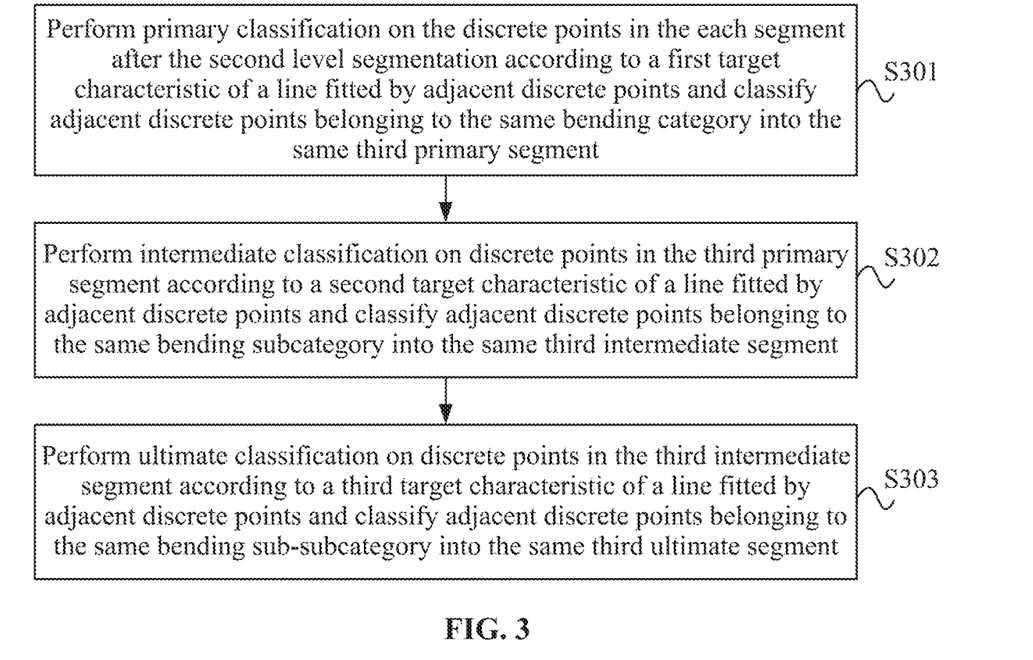
FIG. 3 is a flowchart of a method for third level segmentation according to an embodiment of the present application.
Figure 4:
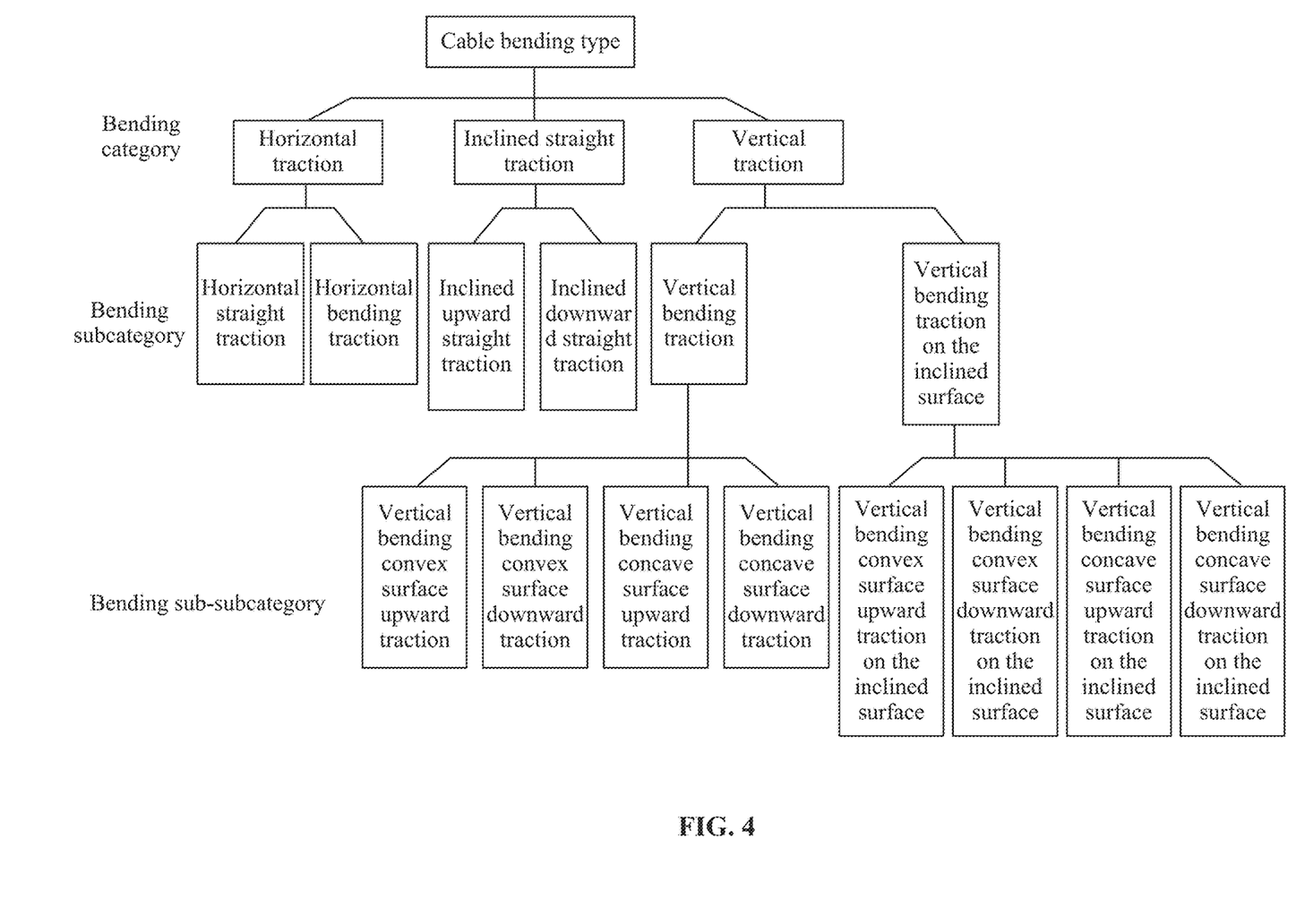
FIG. 4 is a diagram illustrating the constitutional relationship of a cable bending type according to an embodiment of the present application.

FIG. 3 is a flowchart of a method for third level segmentation according to an embodiment of the present application. FIG. 4 is a diagram illustrating the constitutional relationship of a cable bending type according to an embodiment of the present application. In conjunction with FIGS. 3 and 4, based on the preceding embodiments, optionally, that the third level segmentation is performed on the discrete points in the each segment after the second level segmentation according to the cable bending types to which the discrete points belong in S206 includes the steps below.

In S301, primary classification is performed on the discrete points in the each segment after the second level segmentation according to a first target characteristic of a line fitted by adjacent discrete points, and adjacent discrete points belonging to the same bending category are classified into the same third primary segment.

Specifically, the bending category includes horizontal traction, inclined straight traction and vertical traction, and the first target characteristic includes the type of the line and a location of the line. The type of the line may include a straight line and a curved line. The location of the line may include being on the horizontal plane and being on the inclined surface. That the adjacent discrete points are fitted into the line may be that according to coordinates of the discrete points, the discrete points are added one by one for line fitting according to the previous sorting starting from first two discrete points at the beginning of the each segment after the second level segmentation. If the bending category of the line fitted after a certain discrete point is added is changed or is not unique, the discrete point is removed, and a preset number of discrete points after the removed discrete point are added into a fitting sequence to determine whether the bending category of a jointly fitted line is still changed or is still not unique; if yes, it is determined that discrete points before the removed discrete point are fitted into the same line and that the next line continues to be fitted starting from the removed discrete point; and if not, it is determined that the removed discrete point is an error point and that this line continues being fitted. In this manner, the discrete points in the each segment after the second level segmentation may be fitted into multiple lines, and third primary segments are determined according to bending categories corresponding to the multiple lines. Each line is a third primary segment, and all discrete points fitted into the each line also belong to the third primary segment. If the each line is on the horizontal plane, the bending category corresponding to the each line is the horizontal traction. If the each line is not on the horizontal plane and is a straight line, the bending category corresponding to the each line is the inclined straight traction. If the each line is not on the horizontal plane and is a curved line, the bending category corresponding to the each line is the vertical traction.

In S302, intermediate classification is performed on discrete points in the third primary segment according to a second target characteristic of a line fitted by adjacent discrete points, and adjacent discrete points belonging to the same bending subcategory are classified into the same third intermediate segment.

Specifically, the horizontal traction includes horizontal straight traction and horizontal bending traction. The inclined straight traction includes inclined upward straight traction and inclined downward straight traction. The vertical traction includes vertical bending traction and vertical bending traction on the inclined surface. The second target characteristic includes the orientation of the line, the type of the line and the location of the line. The orientation of the line includes upward and downward. The type of the line includes a straight line and a curved line. The location of the line includes horizontal and incline, where the incline is not within the horizontal. That the adjacent discrete points are fitted into the line may be that according to coordinates of the discrete points, the discrete points are added one by one for line fitting according to the previous sorting starting from first two discrete points at the beginning of the third primary segment. If the bending subcategory of the line fitted after a certain discrete point is added is changed or is not unique, it is determined that discrete points before the discrete point are fitted into the same line and that the next line continues to be fitted starting from the discrete point; and if not, this line continues being fitted. In this manner, the discrete points in the third primary segment may be fitted into multiple lines, and third intermediate segments are determined according to bending subcategories corresponding to the multiple lines. Each line is a third intermediate segment, and all discrete points fitted into the each line also belong to the third intermediate segment. If the each line under the category of the horizontal traction is a straight line, the bending subcategory corresponding to the each line is horizontal straight traction. If the each line under the category of the horizontal traction is a curved line, the bending subcategory corresponding to the each line is horizontal bending traction. If the each line under the category of the inclined straight traction is upward, the bending subcategory corresponding to the each line is inclined upward straight traction. If the each line under the category of the inclined straight traction is downward, the bending subcategory corresponding to the each line is inclined downward straight traction. If the each line under the category of the vertical traction is not on the inclined surface, the bending subcategory corresponding to the each line is vertical bending traction. If the each line under the category of the vertical traction is on the inclined surface, the bending subcategory corresponding to the each line is vertical bending traction on the inclined surface.

In S303, ultimate classification is performed on discrete points in the third intermediate segment according to a third target characteristic of a line fitted by adjacent discrete points, and adjacent discrete points belonging to the same bending sub-subcategory are classified into the same third ultimate segment.

Specifically, the vertical bending traction includes vertical bending convex surface upward traction, vertical bending convex surface downward traction, vertical bending concave surface upward traction and vertical bending concave surface downward traction; the vertical bending traction on the inclined surface includes vertical bending convex surface upward traction on the inclined surface, vertical bending convex surface downward traction on the inclined surface, vertical bending concave surface upward traction on the inclined surface and vertical bending concave surface downward traction on the inclined surface. The third target characteristic includes a concave-convex characteristic and the facing orientation of the line. The concave-convex characteristic includes the concave surface and the convex surface. The facing orientation of the line includes downward and upward. That the adjacent discrete points are fitted into the line may be that according to coordinates of the discrete points, the discrete points are added one by one for line fitting according to the previous sorting starting from first two discrete points at the beginning of the third intermediate segment (a third intermediate segment corresponding to the vertical bending traction or the vertical bending traction on the inclined surface is used). If the bending sub-subcategory of the line fitted after a certain discrete point is added is changed or is not unique, it is determined that discrete points before the discrete point are fitted into the same line and that the next line continues to be fitted starting from the discrete point; and if not, this line continues being fitted. In this manner, the discrete points in the third intermediate segment may be fitted into multiple lines, and third ultimate segments are determined according to bending sub-subcategories corresponding to the multiple lines. Each line is a third ultimate segment, and all discrete points fitted into the each line also belong to the third ultimate segment. If the each line under the subcategory of the vertical bending traction is located on the convex surface and upward, the bending sub-subcategory corresponding to the each line is the vertical bending convex surface upward traction. If the each line under the subcategory of the vertical bending traction is located on the convex surface and downward, the bending sub-subcategory corresponding to the each line is the vertical bending convex surface downward traction. If the each line under the subcategory of the vertical bending traction is located on the concave surface and upward, the bending sub-subcategory corresponding to the each line is the vertical bending concave surface upward traction. If the each line under the subcategory of the vertical bending traction is located on the concave surface and downward, the bending sub-subcategory corresponding to the each line is the vertical bending concave surface downward traction. If the each line under the subcategory of the vertical bending traction on the inclined surface is located on the convex surface and upward, the bending sub-subcategory corresponding to the each line is the vertical bending convex surface upward traction on the inclined surface. If the each line under the subcategory of the vertical bending traction on the inclined surface is located on the convex surface and downward, the bending sub-subcategory corresponding to the each line is the vertical bending convex surface downward traction on the inclined surface. If the each line under the subcategory of the vertical bending traction on the inclined surface is located on the concave surface and upward, the bending sub-subcategory corresponding to the each line is the vertical bending concave surface upward traction on the inclined surface. If the each line under the subcategory of the vertical bending traction on the inclined surface is located on the concave surface and downward, the bending sub-subcategory corresponding to the each line is the vertical bending concave surface downward traction on the inclined surface.

In the method for analyzing a laying stress on a cable provided in this embodiment, the discrete points are segmented according to the cable grounding manners, the cabling manners and the cable bending types that correspond to the discrete points of the pipeline detection in the cabling channel, the successive discrete points belonging to the same cable grounding manner, the same cabling manner, and the same cable bending type are classified into the same segment, and further, according to the segmentation information and the measurement information of the discrete points, the stress analysis calculation is performed on the discrete points so that the at least one of the traction force or the side pressure that is applied to the each segment of the cable in real time during the laying process can be obtained. In this manner, the stress analysis of the each segment of the cable during the cable laying process can be achieved in real time, and the each segment formed after the second level segmentation can be divided into multiple smaller segments according to cable bending types corresponding to lines fitted by the discrete points so that the cable can be further classified, providing smaller and more scientific calculation segments for the subsequent stress analysis and further improving the reliability of the stress analysis.

Figure 5:
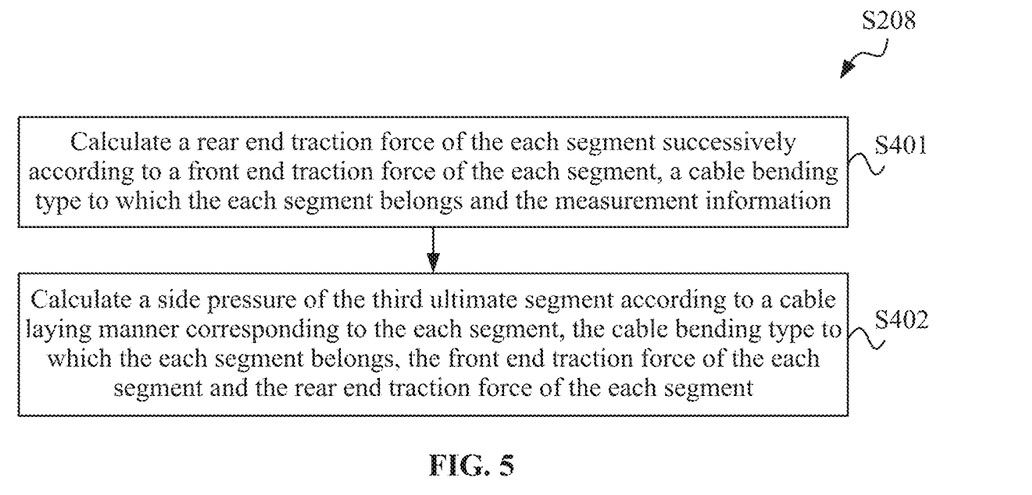
FIG. 5 is a flowchart of a method for stress analysis calculation according to an embodiment of the present application.

FIG. 5 is a flowchart of a method for stress analysis calculation according to an embodiment of the present application. Referring to FIG. 5, based on the preceding embodiments, optionally, that the stress analysis calculation is performed on the discrete points according to the segmentation information and the measurement information of the discrete points in S208 includes the steps below.

In S401, a rear end traction force of the each segment is successively calculated according to a front end traction force of the each segment, a cable bending type to which the each segment belongs and the measurement information.

Specifically, a front end traction force of a first segment is a preset front end traction force, and a front end traction force of another segment is a rear end traction force of the previous segment. The measurement information includes the coordinates of the discrete points, the friction coefficient for laying the cable and the weight of the cable per unit length. The first segment and another segment herein refer to third ultimate segments obtained after the third level segmentation.

Exemplarily, in the case where a cable bending type corresponding to a segment of the cable is the horizontal straight traction, a rear end traction force of the segment of the cable is calculated according to a first formula, where the first formula is $T_2 = T_1 + \mu W L$, where $T_2$ denotes the rear end traction force, $T_1$ denotes the front end traction force, u denotes the friction coefficient for laying the cable, W denotes the weight of the cable per unit length, L denotes the length of the segment of the cable, and $L = |\overrightarrow{b_1 b_n}|$, where $b_1$ denotes a first discrete point in the third ultimate segment, and by denotes the last discrete point in the third ultimate segment. Because the cable is coiled on a cable reel when leaving the factory, the cable can start to be laid after the cable is drawn to the preset lower reel length during laying. Considering the friction between a shaft hole of the cable reel and a shaft of the cable reel, the front end traction force of a first third ultimate segment may be approximately converted to the weight of the cable with the preset length, for example, the weight of a 15-meter cable.

In the case where the cable bending type corresponding to the segment of the cable is the horizontal bending traction, the rear end traction force of the segment of the cable is calculated according to a second formula, where the second formula is $T_2 = T_1 e^{\mu \theta}$, where $\theta$ denotes a central angle of a bending portion and may be calculated according to coordinates of discrete points in the segment of the cable, and $\theta=\pi-\arccos(\overrightarrow{b_1 b_2}, \overrightarrow{b_{n-1} b_n})$, where $b_1$ denotes the first discrete point in the third ultimate segment, $b_2$ denotes a second discrete point in the third ultimate segment, $b_{n-1}$ denotes a penultimate discrete point in the third ultimate segment, and $b_n$ denotes the last discrete point in the third ultimate segment.

In the case where the cable bending type corresponding to the segment of the cable is the inclined upward straight traction, the rear end traction force of the segment of the cable is calculated according to a third formula, where the third formula is $T_2=T_1+WL(\mu\cos\theta_1-\sin\theta_1)$, where $\theta_1$ denotes an inclined angle at an inclined straight traction location for the cable and may be calculated according to the coordinates of the discrete points in the segment of the cable, and $$\theta_1 = \frac{\pi}{2} - \arccos\langle \overrightarrow{b_1 b_n}, \overrightarrow{A_\beta,}\rangle,$$

where $b_1$ denotes the first discrete point in the third ultimate segment, $b_n$ denotes the last discrete point in the third ultimate segment, and $A_\beta$ denotes a direction vector of a straight line fitted by all the discrete points in the third ultimate segment.

In the case where the cable bending type corresponding to the segment of the cable is the inclined downward straight traction, the rear end traction force of the segment of the cable is calculated according to a fourth formula, where the fourth formula is $T_2=T_1+WL(\mu\cos\theta_1+\sin\theta_1)$.

In the case where the cable bending type corresponding to the segment of the cable is the vertical bending convex surface upward traction, the rear end traction force of the segment of the cable is calculated according to a fifth formula, where the fifth formula is $$T_2 = \frac{WR}{1+\mu^2}\left[(1-\mu^2)\sin\theta + 2\mu\left(e^{\mu\theta}-\cos\theta\right)\right] + T_1 e^{\mu\theta},$$

where R denotes the bending radius of the cable in the segment and may be calculated according to the coordinates of the discrete points in the segment of the cable, and $$R = \frac{\sum_{i=1}^{i=n} |\overrightarrow{b_i b_{i+1}}|}{\pi - \arccos\langle \overrightarrow{b_1 b_2}, \overrightarrow{b_{n-1} b_n}\rangle},$$

where $b_i$ denotes an ith discrete point in the third ultimate segment, and $b_i1$ denotes a (i+1)th discrete point in the third ultimate segment. In the case where the cable bending type corresponding to the segment of the cable is the vertical bending convex surface downward traction, the rear end traction force of the segment of the cable is calculated according to a sixth formula, where the six formula is $$T_2 = \frac{WR}{1+\mu^2}\left[2\mu\sin\theta - (1-\mu^2)\left(e^{\mu\theta}-\cos\theta\right)\right] + T_1 e^{\mu\theta}.$$

In the case where the cable bending type corresponding to the segment of the cable is the vertical bending concave surface upward traction, the rear end traction force of the segment of the cable is calculated according to a seventh formula, where the seven formula is $$T_2 = T_1 e^{\mu\theta} - \frac{WR}{1+\mu^2}\left[2\mu\sin\theta - (1-\mu^2)\left(e^{\mu\theta}-\cos\theta\right)\right].$$

In the case where the cable bending type corresponding to the segment of the cable is the vertical bending concave surface downward traction, the rear end traction force of the segment of the cable is calculated according to an eighth formula, where the eighth formula is $$T_2 = T_1 e^{\mu\theta} - \frac{WR}{1+\mu^2}\left[(1-\mu^2)\sin\theta + 2\mu\left(e^{\mu\theta}-\cos\theta\right)\right].$$

In the case where the cable bending type corresponding to the segment of the cable is the vertical bending convex surface upward traction on the inclined surface, the rear end traction force of the segment of the cable is calculated according to a ninth formula, where the ninth formula is $$T_2 = T_1 e^{\mu\theta} + \frac{WR\sin\alpha}{1+\mu^2}\left[(1-\mu^2)\sin\theta + 2\mu\left(e^{\mu\theta}-\cos\theta\right)\right],$$

where $\alpha$ denotes an included angle between the inclined surface on which discrete points are located and the horizontal plane in the segment of the cable and may be calculated according to the coordinates of the discrete points in the segment of the cable.

In the case where the cable bending type corresponding to the segment of the cable is the vertical bending convex surface downward traction on the inclined surface, the rear end traction force of the segment of the cable is calculated according to a tenth formula, where the tenth formula is $$T_2 = T_1 e^{\mu\theta} + \frac{WR\sin\alpha}{1+\mu^2}\left[(1-\mu^2)\left(e^{\mu\theta}-\cos\theta\right) + 2\mu\sin\theta\right].$$

In the case where the cable bending type corresponding to the segment of the cable is the vertical bending concave surface upward traction on the inclined surface, the rear end traction force of the segment of the cable is calculated according to an eleventh formula, where the eleventh formula is $$T_2 = T_1 e^{\mu\theta} - \frac{WR\sin\alpha}{1+\mu^2}\left[(1+\mu^2)\left(\cos\theta - e^{\mu\theta}\right) + 2\mu\sin\theta\right].$$

In the case where the cable bending type corresponding to the segment of the cable is the vertical bending concave surface downward traction on the inclined surface, the rear end traction force of the segment of the cable is calculated according to a twelfth formula, where the twelfth formula is $$T_2 = T_1 e^{\mu\theta} + \frac{WR\sin\alpha}{1+\mu^2}\left[-(1-\mu^2)\sin\theta + 2\mu\left(\cos\theta - e^{\mu\theta}\right)\right].$$

In S402, a side pressure of the third ultimate segment is calculated according to a cabling manner corresponding to the each segment, the cable bending type to which the each segment belongs, the front end traction force of the each segment and the rear end traction force of the each segment.

Specifically, when a certain segment of the cable belongs to the horizontal bending traction, the vertical bending convex surface upward traction, the vertical bending convex surface downward traction, the vertical bending concave surface upward traction, the vertical bending concave surface downward traction, the vertical bending convex surface upward traction on the inclined surface, the vertical bending convex surface downward traction on the inclined surface, the vertical bending concave surface upward traction on the inclined surface, or the vertical bending concave surface downward traction on the inclined surface, a sheath layer of the cable has to withstand the side pressure. Generally, when the bending portion is located in the segment for the cable nonbuilding structure laying, and when the cable is laid, a roller is generally disposed at a turning location to control the side pressure withstood by the sheath layer of the cable not to exceed the maximum allowable side pressure withstood by the sheath layer of the cable. When the bending portion is located in the segment for the dragging pipe laying, limited by the diameter of a dragging pipe, an additional auxiliary device cannot be generally disposed at the turning location when the cable is laid. The cable is in hard contact with the internal wall of the dragging pipe, which may be approximated as an arced skateboard. The turning radius of the cable is basically the same as the turning radius of the turning location of the dragging pipe. Therefore, when the laying manner for the certain segment of the cable is the cable nonbuilding structure laying, the calculation formula of the side pressure is $$P1 = 2T \sin \frac{\theta''}{2},$$

where T is a traction force of the bending portion of the third ultimate segment and may be equal to the average value of the front end traction force and the rear end traction force, θ" is the central angle corresponding to an arced segment between two adjacent rollers when rollers are used at the bending portion of the third ultimate segment, and the unit is rad. When the laying manner for the certain segment of the cable is the dragging pipe laying, the calculation formula of the side pressure is $$P2 = \frac{T}{R}.$$

In the method for analyzing a laying stress on a cable provided in this embodiment, the discrete points are segmented according to the cable grounding manners, the cabling manners and the cable bending types that correspond to the discrete points of the pipeline detection in the cabling channel, the successive discrete points belonging to the same cable grounding manner, the same cabling manner, and the same cable bending type are classified into the same segment, and further, the stress analysis calculation is performed on the discrete points according to the segmentation information and the measurement information of the discrete points, so that the at least one of the traction force or the side pressure that is applied to the each segment of the cable in real time during the laying process can be obtained. In this manner, before the stress analysis, the discrete points are first sorted and numbered initially according to the cable detection sequence, all the successive discrete points are then segmented three times successively according to the cable grounding manners, the cabling manners and the cable bending types, the discrete points within the each segment after the each segmentation are re-sorted according to the cable laying direction, and the stress analysis is performed on the minimum segments according to calculation formulas corresponding to the minimum segments so that the traction force of the each minimum segment and/or the side pressure of the minimum segment can be obtained, analyzing the stress force on the cable. Moreover, the traction force and/or the side pressure can be calculated according to segmentation information of the each minimum segment so that the stress analysis can be more scientific and detailed, improving the accuracy of the stress analysis.

Figure 6:
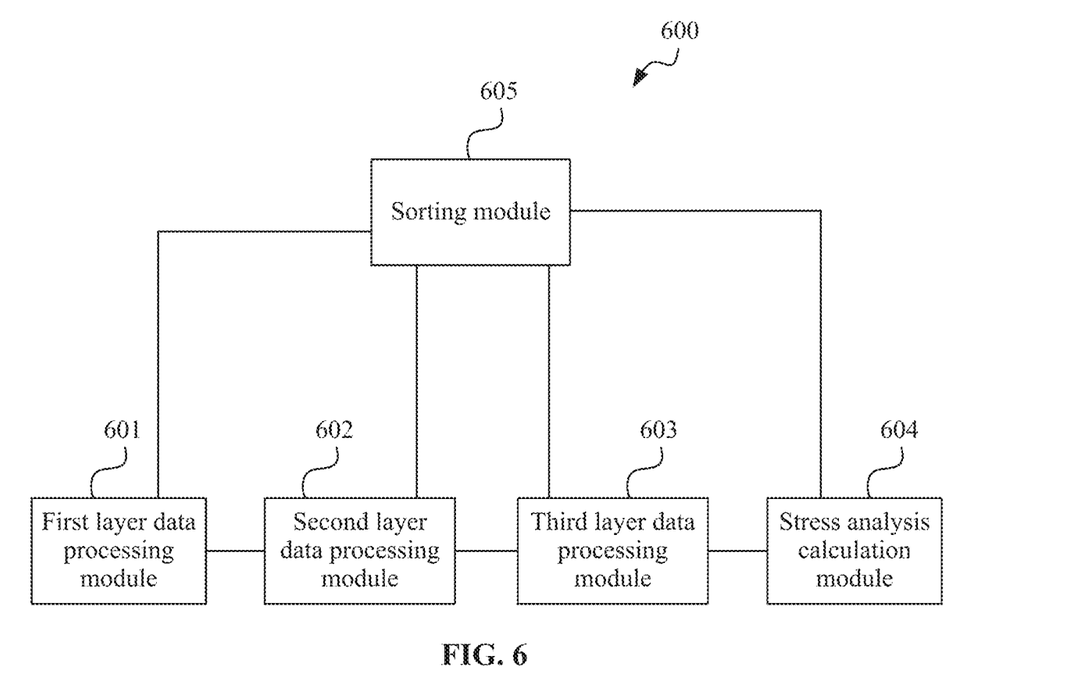
FIG. 6 is a diagram illustrating the structure of an apparatus for analyzing a laying stress on a cable according to an embodiment of the present application.

An embodiment of the present application further provides an apparatus for analyzing a laying stress on a cable. FIG. 6 is a diagram illustrating the structure of an apparatus for analyzing a laying stress on a cable according to an embodiment of the present application. Referring to FIG. 6, the apparatus 600 for analyzing a laying stress on a cable includes a first layer data processing module 601, a second layer data processing module 602, a third layer data processing module 603, a stress analysis calculation module 604 and a sorting module 605. The first layer data processing module 601 is configured to perform first level segmentation on discrete points according to cable grounding manners corresponding to the discrete points. The second layer data processing module 602 is configured to perform second level segmentation on discrete points in each segment after the previous segmentation according to cabling manners corresponding to the discrete points. The third layer data processing module 603 is configured to perform third level segmentation on discrete points in each segment after the previous segmentation according to cabling bending types to which the discrete points belong. The stress analysis calculation module 604 is configured to perform stress analysis calculation on the discrete points according to segmentation information and measurement information of the discrete points. The sorting module 605 is configured to initially sort and number the discrete points according to a pipeline detection direction and a cable line direction and re-sort and number discrete points in each segment after each of the first level segmentation, the second level segmentation and the third level segmentation.

Figure 7:
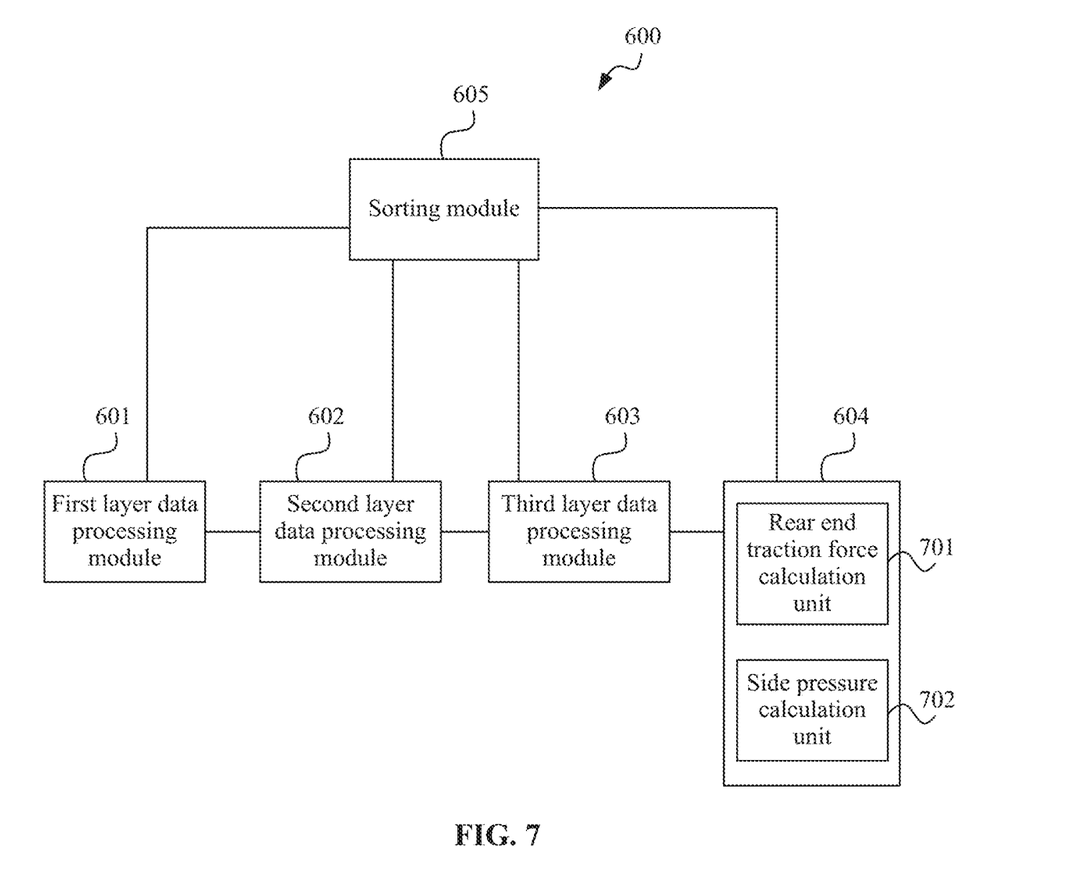
FIG. 7 is another diagram illustrating the structure of an apparatus for analyzing a laying stress on a cable according to an embodiment of the present application.

FIG. 7 is another diagram illustrating the structure of an apparatus for analyzing a laying stress on a cable according to an embodiment of the present application. Referring to FIG. 7, based on the preceding embodiment, optionally, the stress analysis calculation module 604 includes a rear end traction force calculation unit 701 and a side pressure calculation unit 702. The rear end traction force calculation unit 701 is configured to successively calculate a rear end traction force of the each segment according to a front end traction force and segmentation information of the third level segmentation, where a front end traction force of a first segment is a preset front end traction force, and a front end traction force of another segment is a rear end traction force of the previous segment. The side pressure calculation unit 702 is configured to calculate a side pressure of each minimum segment in horizontal bending traction, vertical bending traction and vertical bending traction on an inclined surface according to segmentation information of the second level segmentation, the front end traction force and the rear end traction force.

In the method and apparatus for analyzing a laying stress on a cable provided in the present application, the discrete points are segmented according to the cable grounding manners, the cabling manners and the cable bending types that correspond to the discrete points of the pipeline detection in the cabling channel, successive discrete points belonging to the same cable grounding manner, the same cabling manner, and the same cable bending type are classified into the same segment, and further, according to the segmentation information and the measurement information of the discrete points, the stress analysis calculation is performed on the discrete points so that at least one of a traction force or a side pressure that is applied to each segment of the cable in real time during the laying process can be obtained. In this manner, stress analysis of the each segment of the cable during the cable laying process can be achieved in real time, providing data support for laying the cable. Workers responsible for laying the cable can adopt corresponding protective measures during the laying process according to a stress analysis result so that the cable can be really protected, improving the safety of the cable during the cable laying process.

The preceding products can execute the method provided in any embodiment of the present application and have functional modules and beneficial effects corresponding to the executed method.

What is claimed is:

1. A method for cable laying by stress analysis, comprising:
   detecting a cabling channel and determining horizontal positions and heights of discrete points in the cabling channel by a total station for pipeline detection;
   segmenting the cabling channel into a plurality of segmentations according to a segmentation information attribute comprised in each discrete point, wherein each of the segmentations comprises successive discrete points, and the segmentation information attribute comprises cable grounding manners, cabling manners and cable bending types and the step of segmenting comprises: initially sorting and numbering the discrete points from one end of the cabling channel to the other end of the cabling channel according to a direction of the pipeline detection; obtaining first level segments by performing first level segmentation on the discrete points according to the cable grounding manners; obtaining second level segments by performing second level segmentation on discrete points in each first level segment according to the cabling manners; and obtaining third level segments by performing third level segmentation on discrete points in each second level segment according to the cable bending types; wherein after each of the first level segmentation, the second level segmentation or the third level segmentation, the method further comprises: re-sorting and numbering discrete points within each segment of the first level segments, the second level segments, and the third level segments according to a cabling direction; and
   performing stress analysis calculation on each of the third level segments according to segmentation information and measurement information of the discrete points, wherein the segmentation information comprises the cable grounding manners, the cabling manners and the cable bending types that correspond to segments in which the discrete points are located, the measurement information comprises coordinates of the discrete points, a friction coefficient for laying cables and a weight of each cable per unit length, and the stress analysis calculation comprises at least one of calculation of a traction force or calculation of a side pressure;
   laying the cables in the cabling channel according to a stress analysis result thereby protecting the cables, wherein the stress analysis result comprises at least one of the traction force or the side pressure, and the at least one of the traction force or the side pressure is applied to each segment of the cable in real time during laying process to prevent excessive local stress on the cable.

2. The method for cable laying by stress analysis according to claim 1, wherein re-sorting and numbering discrete points within each segment of the first level segments, the second level segments, and the third level segments according to a cabling direction comprises:
   sorting and re-numbering the discrete points along the cabling direction starting from one end of a respective segment to the other end of the respective segment, wherein the cabling direction is consistent with the direction of the pipeline detection or opposite to the direction of the pipeline detection.

3. The method for cable laying by stress analysis according to claim 1, wherein obtaining third level segments by performing third level segmentation on discrete points in each second level segment according to the cable bending types comprises:
   performing primary classification on the discrete points in each segment after the second level segmentation according to a first target characteristic of a line fitted by adjacent discrete points and classifying adjacent discrete points belonging to a same bending category into a same third primary segment, wherein the bending category comprises horizontal traction, inclined straight traction and vertical traction, and the first target characteristic comprises a type of the line and a location of the line;
   performing intermediate classification on discrete points in the third primary segment according to a second target characteristic of a line fitted by adjacent discrete points and classifying adjacent discrete points belonging to a same bending subcategory into a same third intermediate segment, wherein the horizontal traction comprises horizontal straight traction and horizontal bending traction, the inclined straight traction comprises inclined upward straight traction and inclined downward straight traction, the vertical traction comprises vertical bending traction and vertical bending traction on an inclined surface, and the second target characteristic comprises an orientation of the line, a type of the line type and a location of the line; and
   performing ultimate classification on discrete points in the third intermediate segment according to a third target characteristic of a line fitted by adjacent discrete points and classifying discrete points belonging to a same bending sub-subcategory into a same third ultimate segment, wherein the vertical bending traction comprises vertical bending convex surface upward traction, vertical bending convex surface downward traction, vertical bending concave surface upward traction and vertical bending concave surface downward traction; the vertical bending traction on the inclined surface comprises vertical bending convex surface upward traction on the inclined surface, vertical bending convex surface downward traction on the inclined surface, vertical bending concave surface upward traction on the inclined surface and vertical bending concave surface downward traction on the inclined surface, and the third target characteristic comprises a concave-convex characteristic and a facing orientation of the line.

4. The method for cable laying by stress analysis according to claim 3, wherein performing stress analysis calculation on each of the third level segments according to segmentation information and measurement information of the discrete points comprises:
   successively calculating a rear end traction force of each third ultimate segment according to a front end traction force of a respective third ultimate segment, a cable bending type to which the respective third ultimate segment belongs and the measurement information, wherein a front end traction force of a first third ultimate segment is a preset front end traction force, a front end traction force of another third ultimate segment is a rear end traction force of a previous third ultimate segment, and the measurement information comprises coordinates of the discrete points, a friction coefficient for laying the cable and a weight of the cable per unit length.

5. The method for cable laying by stress analysis according to claim 4, wherein performing stress analysis calculation on each of the third level segments according to segmentation information and measurement information of the discrete points comprises:
   calculating a side pressure of the third ultimate segment according to a cabling manner corresponding to each segment, the cable bending type to which each segment belongs, the front end traction force of each segment and the rear end traction force of each segment.

6. The method for cable laying by stress analysis according to claim 4, wherein successively calculating the rear end traction force of each third ultimate segment according to the front end traction force of the respective third ultimate segment and the cable bending type to which the respective third ultimate segment belongs comprises:
   when the cable bending type for the segment is the horizontal straight traction, calculating a rear end traction force of the segment of the cable according to a first formula, wherein the first formula is $T_2=T_1+\mu WL$, wherein $T_2$ denotes the rear end traction force, $T_1$ denotes a front end traction force, $\mu$ denotes the friction coefficient for laying the cable, $W$ denotes a weight of the cable per unit length, and $L$ denotes a length of the segment of the cable;
   when the cable bending type for the segment is the horizontal bending traction, calculating the rear end traction force of the segment of the cable according to a second formula, wherein the second formula is $T_2=T_1 e^{\mu\theta}$, wherein $\theta$ denotes a central angle of a bending portion;
   when the cable bending type for the segment is the inclined upward straight traction, calculating the rear end traction force of the segment of the cable according to a third formula, wherein the third formula is $T_2=T_1+WL(\mu\cos\theta_1-\sin\theta_1)$, wherein $\theta_1$ denotes an inclined angle at an inclined straight traction location for the cable;
   when the cable bending type for the segment is the inclined downward straight traction, calculating the rear end traction force of the segment of the cable according to a fourth formula, wherein the fourth formula is $T_2=T_1+WL(\mu\cos\theta_1+\sin\theta_1)$;
   when the cable bending type for the segment is the vertical bending convex surface upward traction, calculating the rear end traction force of the segment of the cable according to a fifth formula, wherein the fifth formula is $$T_2 = \frac{WR}{1+\mu^2}\left[(1-\mu^2)\sin\theta + 2\mu\left(e^{\mu\theta}-\cos\theta\right)\right] + T_1 e^{\mu\theta},$$

wherein $R$ denotes a bending radius of the cable in the segment;
   when the cable bending type for the segment is the vertical bending convex surface downward traction, calculating the rear end traction force of the segment of the cable according to a sixth formula, wherein the sixth formula is $$T_2 = \frac{WR}{1+\mu^2}\left[2\mu\sin\theta - (1-\mu^2)\left(e^{\mu\theta}-\cos\theta\right)\right] + T_1 e^{\mu\theta};$$

when the cable bending type for the segment is the vertical bending concave surface upward traction, calculating the rear end traction force of the segment of the cable according to a seventh formula, wherein the seventh formula is $$T_2 = T_1 e^{\mu\theta} - \frac{WR}{1+\mu^2}\left[2\mu\sin\theta - (1-\mu^2)\left(e^{\mu\theta}-\cos\theta\right)\right];$$

when the cable bending type for the segment is the vertical bending concave surface downward traction, calculating the rear end traction force of the segment of the cable according to an eighth formula, wherein the eighth formula is $$T_2 = T_1 e^{\mu\theta} - \frac{WR}{1+\mu^2}\left[(1-\mu^2)\sin\theta + 2\mu\left(e^{\mu\theta}-\cos\theta\right)\right];$$

when the cable bending type for the segment is the vertical bending convex surface upward traction on the inclined surface, calculating the rear end traction force of the segment of the cable according to a ninth formula, wherein the ninth formula is $$T_2 = T_1 e^{\mu\theta} + \frac{WR\sin\alpha}{1+\mu^2}\left[(1-\mu^2)\sin\theta + 2\mu\left(e^{\mu\theta}-\cos\theta\right)\right],$$

wherein $\alpha$ denotes an included angle between an inclined surface on which discrete points are located and a horizontal plane in the segment of the cable;
   when the cable bending type for the segment is the vertical bending convex surface downward traction on the inclined surface, calculating the rear end traction force of the segment of the cable according to a tenth formula, wherein the tenth formula is $$T_2 = T_1 e^{\mu\theta} + \frac{WR\sin\alpha}{1+\mu^2}\left[(1-\mu^2)\left(e^{\mu\theta}-\cos\theta\right) + 2\mu\sin\theta\right];$$

when the cable bending type for the segment is the vertical bending concave surface upward traction on the inclined surface, calculating the rear end traction force of the segment of the cable according to an eleventh formula, wherein the eleventh formula is $$T_2 = T_1 e^{\mu\theta} - \frac{WR\sin\alpha}{1+\mu^2}\left[(1+\mu^2)(\cos\theta - e^{\mu\theta}) + 2\mu\sin\theta\right];$$

and when the cable bending type for the segment is the vertical bending concave surface downward traction on the inclined surface, calculating the rear end traction force of the segment of the cable according to a twelfth formula, wherein the twelfth formula is $$T_2 = T_1 e^{\mu\theta} + \frac{WR\sin\alpha}{1+\mu^2}\left[-(1-\mu^2)\sin\theta + 2\mu(\cos\theta - e^{\mu\theta})\right].$$

7. An apparatus for cable laying by stress analysis, the apparatus comprising:
one or more processors; and
a storage device configured to store one or more programs, wherein
the one or more programs, when executed by the one or more processors, cause the one or more processors to perform the method of claim 1.

* * * * *